United States Patent [19]

Williams

[11] Patent Number: 4,796,219
[45] Date of Patent: Jan. 3, 1989

[54] SERIAL TWO'S COMPLEMENT MULTIPLIER

[75] Inventor: Tim A. Williams, Austin, Tex.

[73] Assignee: Motorola, Inc., Schaumburg, Ill.

[21] Appl. No.: 56,493

[22] Filed: Jun. 1, 1987

[51] Int. Cl.$^4$ .............................................. G06F 7/52
[52] U.S. Cl. .................................................... 364/758
[58] Field of Search ............................ 364/758, 757

[56] References Cited

U.S. PATENT DOCUMENTS

| | | | |
|---|---|---|---|
| 3,805,043 | 4/1974 | Clary | 364/758 |
| 3,947,670 | 3/1976 | Irwin et al. | 364/758 |
| 3,956,622 | 5/1976 | Lyon | 364/758 |
| 4,432,066 | 2/1984 | Benschop | 364/758 |
| 4,507,749 | 3/1985 | Ohhashi | 364/757 |

OTHER PUBLICATIONS

Swartzlander, Jr., "The Quasi-Serial Multiplier", *IEEE Trans. on Computers*, vol. C-22, No. 4, Apr., 1973, pp. 317-321.

McDonald et al., "The Two's Complement Quasi-Serial Multiplier", *IEEE Trans. on Computers*, Dec. 1975, pp. 1233-1235.

Gnanasekaran, "On a Bit-Serial Input and Bit-Serial Output Multiplier", *IEEE Trans. on Computers*, vol. C-32, No. 9, Sep. 1983, pp. 878-880.

*Primary Examiner*—David H. Malzahn
*Attorney, Agent, or Firm*—John A. Fisher; Robert L. King

[57] ABSTRACT

A pipelined multiplier which serially receives a signed input multiplicand and a signed multiplier to generate a signed serial output product is provided. The multiplier utilizes a technique which simplifies the addition of partial product bits by creating a uniform partial product array. Columns of partial product bits are sequentially added in a pipelined structure. Carry bits which are generated during the column addition of partial product bits are delayed in the pipeline and coupled back to the input of the pipeline at the appropriate time for another addition of column bits as product bits are serially outputted. By minimizing delays in the pipeline, multiplication of signed operands of large bit length may be quickly performed.

8 Claims, 7 Drawing Sheets

|       |       |       |       | XS    | X2    | X1    | X0    |
|-------|-------|-------|-------|-------|-------|-------|-------|
|       |       |       |       | YS    | Y2    | Y1    | Y0    |
|       |       |       |       | −XSY0 | X2Y0  | X1Y0  | X0Y0  |
|       |       |       | −XSY1 | X2Y1  | X1Y1  | X0Y1  |       |
|       |       | −XSY2 | X2Y2  | X1Y2  | X0Y2  |       |       |
|       | XSYS  | −X2YS | −X1YS | −X0YS |       |       |       |
| PS    | P5    | P4    | P3    | P2    | P1    | P0    |       |

FIG. 1A

|       |       |       |       | XS    | X2    | X1    | X0    |
|-------|-------|-------|-------|-------|-------|-------|-------|
|       |       |       |       | YS    | Y2    | Y1    | Y0    |
| −XSY0 | XSY0  | XSY0  | XSY0  | XSY0  | X2Y0  | X1Y0  | X0Y0  |
| −XSY1 | XSY1  | XSY1  | XSY1  | X2Y1  | X1Y1  | X0Y1  |       |
| −XSY2 | XSY2  | XSY2  | X2Y2  | X1Y2  | X0Y2  |       |       |
| XSYS  | XSYS  | −X2YS | −X1YS | −X0YS |       |       |       |
| PS    | P5    | P4    | P3    | P2    | P1    | P0    |       |

FIG. 1B

|       |       |       |       | XS    | X2    | X1    | X0    |
|-------|-------|-------|-------|-------|-------|-------|-------|
|       |       |       |       | YS    | Y2    | Y1    | Y0    |
| −XSY0 | XSY0  | XSY0  | XSY0  | XSY0  | X2Y0  | X1Y0  | X0Y0  |
| −XSY1 | XSY1  | XSY1  | XSY1  | X2Y1  | X1Y1  | X0Y1  |       |
| −XSY2 | XSY2  | XSY2  | X2Y2  | X1Y2  | X0Y2  |       |       |
| XSYS  | $\overline{XSYS}$ | $\overline{X2YS}$ | $\overline{X1YS}$ | $\overline{X0YS}$ |       |       |       |
|       |       |       |       | 1     |       |       |       |
| PS    | P5    | P4    | P3    | P2    | P1    | P0    |       |

FIG. 1C

|  |  |  | XS | X2 | X1 | X0 |
|---|---|---|---|---|---|---|
|  |  |  | YS | Y2 | Y1 | Y0 |
| XSY0 | XSY0 | XSY0 | XSY0 | X2Y0 | X1Y0 | X0Y0 |
| XSY1 | XSY1 | XSY1 | X2Y1 | X1Y1 | X0Y1 |  |
| XSY2 | XSY2 | X2Y2 | X1Y2 | X0Y2 |  |  |
| $\overline{XSYS}$ | $\overline{X2YS}$ | $\overline{X1YS}$ | $\overline{X0YS}$ | 1 | 1 | 1 |
|  |  |  |  |  |  | 1 |
| PS | P5 | P4 | P3 | P2 | P1 | P0 |

*CLOCK CYCLE ONE*

*CLOCK CYCLE TWO*

CLOCK CYCLE THREE

CLOCK CYCLE FOUR

*CLOCK CYCLE FIVE*

*CLOCK CYCLE SIX*

SERIAL TWO'S COMPLEMENT MULTIPLIER

TECHNICAL FIELD

This invention relates generally to multiplier circuits, and more particularly, to multipliers for multiplying signed operands in serial data format.

BACKGROUND ART

Multiplier circuits which receive input data in serial format are typically much more size efficient to implement in hardware than are multiplier circuits which operate with input data in parallel format. Reasons for the truth of this statement include the fact that signals in a serial data multiplier may be routed more simply and efficiently than when the data is in a parallel format. Also, mathematical functions may be more efficiently implemented from a hardware standpoint when input data is in the serial form. High data throughput may be achieved in a serial data multiplier by using a pipeline architecture and by minimizing worst case delay paths in the pipeline. In contrast, many known Booth's or Modified Booth's algorithm multiplier architectures are slower because the nature of the algorithm requires the accumulation of a product wide result which has the disadvantage of long carry chains. Therefore, a serial data multiplier is typically faster than many known multiplier architectures. However, the known serial data multipliers are not typically capable of multiplying signed input operands. When signed input operands are multiplied, others have typically used a parallel input data architecture.

BRIEF DESCRIPTION OF THE INVENTION

Accordingly, an object of the present invention is to provide an improved high speed serial two's complement multiplier.

Another object of this invention is to provide an improved high speed serial data multiplier for multiplying signed input operands.

Yet another object of the present invention is to provide an improved method for multiplying two signed input data operands in serial format with a hardware multiplier architecture.

In carrying out the above and other objects of the present invention, there is provided, in one form, a serial data multiplier having a first clocked data storage circuit for serially receiving a first signed input operand and storing a sign bit and magnitude bits of the first input operand in a first predetermined order. A second clocked data storage circuit having predetermined register locations serially receives a second signed input operand. The sign bit and magnitude bits of the second input operand are clocked thru the second data storage circuit until the second data storage circuit contains the sign bit of the second operand in all the predetermined register locations. A logic circuit is coupled to the first and second clocked data storage circuits for successively forming groups of predetermined partial product bits of positive value in response to receiving clocked bits from the first and second data storage circuits. A summing circuit is coupled to the logic circuit for successively receiving the groups of predetermined partial product bits from the logic circuit and adding the partial product bits to provide output product bits and carry bits. The summing circuit has a delay portion for delaying outputting of the carry bits generated from the addition of partial product bits before coupling the carry bits to the input of the summing circuit for a successive output product bit generation in response to receipt of another group of partial product bits from the logic circuit. The delay portion further provides a correction carry input bit for the summing circuit for use during an initial addition of partial product bits.

These and other objects, features and advantages will be more clearly understood from the following detailed description taken in conjunction with the accompanying drawings.

BRIEF DESCRIPTION OF THE DRAWINGS

FIGS. 1(A) thru 1(D) illustrate varying multiplication array forms of partial product bits formed during the multiplication of two signed input operands;

FIG. 2 illustrates in block diagram form a multiplier circuit substantially in accordance with the present invention;

DETAILED DESCRIPTION OF THE INVENTION

Figures 1D, 2:
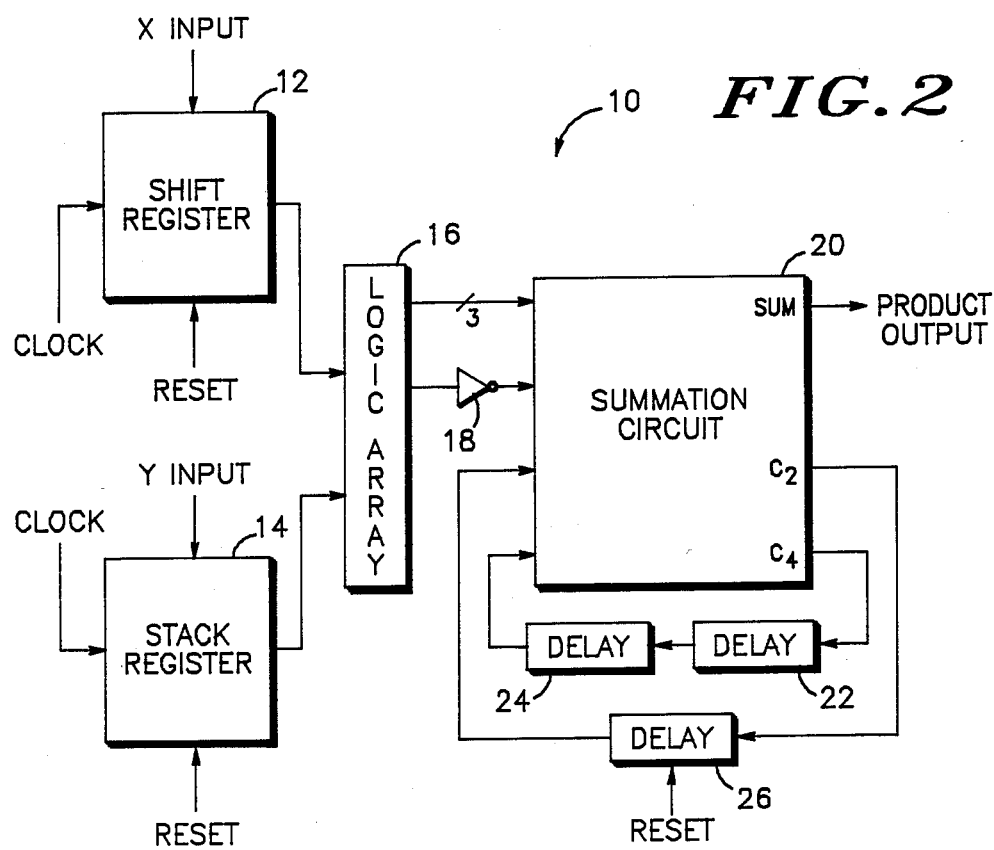
Figure 3A:
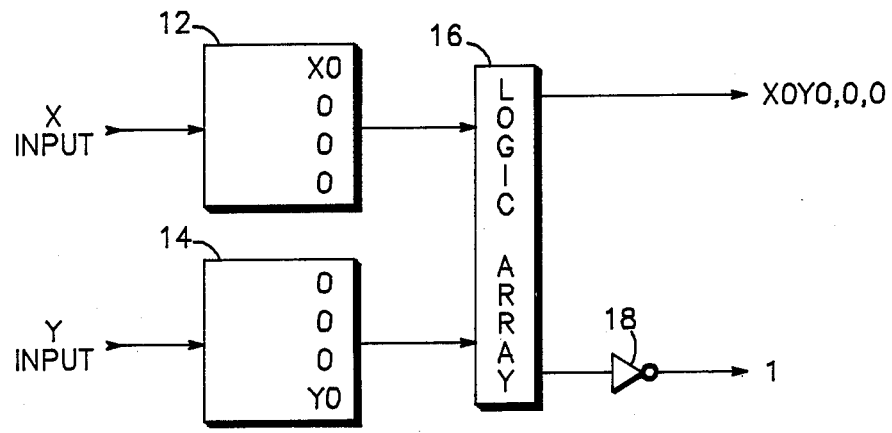
FIGS. 3(A) thru 3(G) illustrate in block diagram form a clocked operation of a portion of the multiplier of FIG. 2.
Figure 3B:
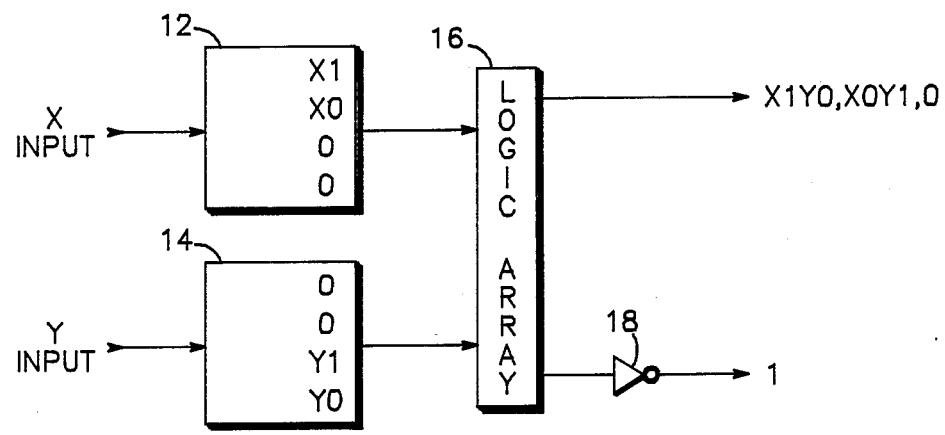
Figure 3C:
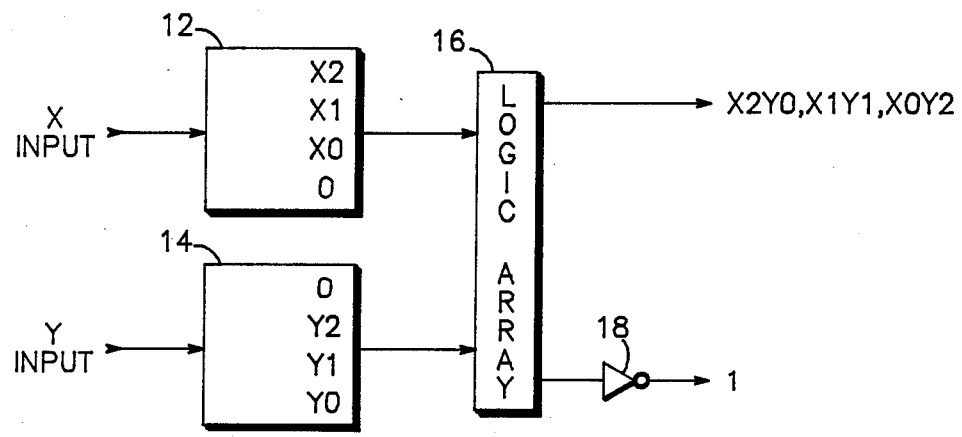
Figure 3D:
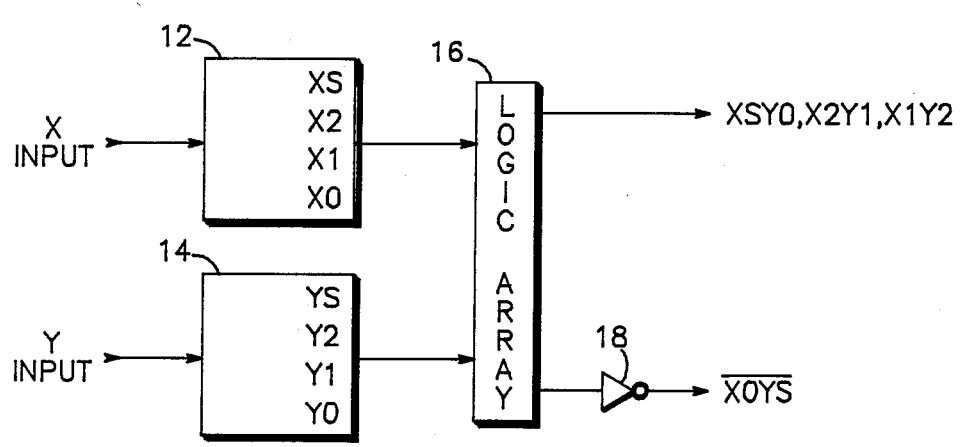
Figure 3E:
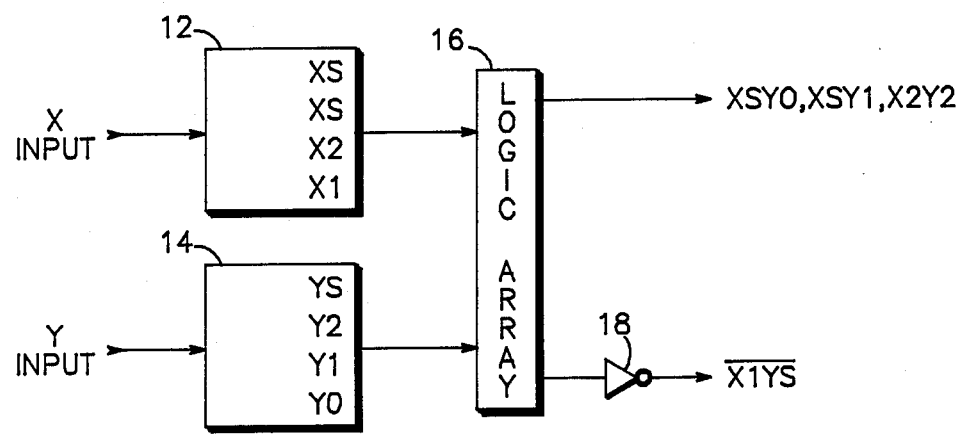
Figure 3F:
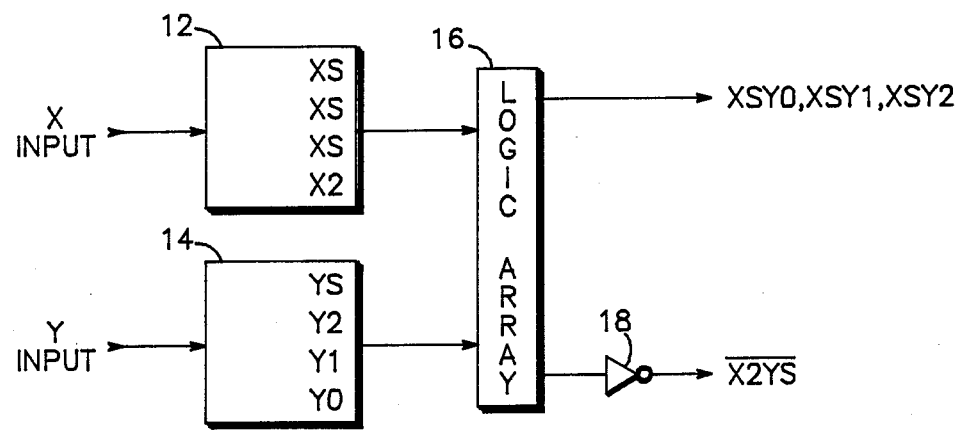
Figure 3G:
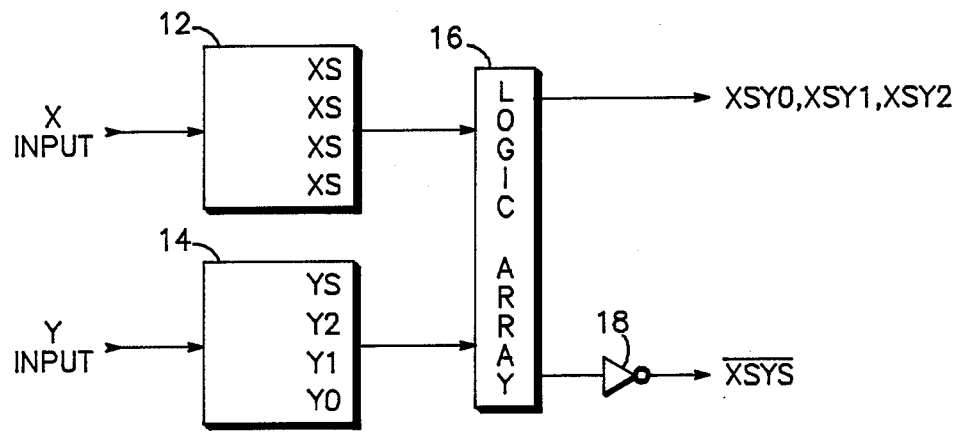

Shown in FIG. 1(A) is an array illustrating the multiplication of two signed input operands X and Y. For purposes of illustration only, operands of four bits width are described. It should be readily understood that the principles described herein are applicable to operands of any bit width. Input operand X has a sign bit labeled "XS" and three magnitude bits "X0", "X1" and "X2" from least significant bit to most significant bit, respectively. Similarly, input operand Y has a sign bit labeled "YS" and three magnitude bits "Y0", "Y1" and "Y2" from least significant bit to most significant bit, respectively. Four rank ordered rows of partial product bits are generated wherein each of the first three rows contains a sign bit and three magnitude bits, and the fourth row contains exclusively signed bits. Each partial product bit in each row is a modulo two product of an X operand bit and a Y operand bit. The notation used in FIG. 1 for partial product bits such as "X0Y0" represents a logical "ANDing" of an X operand bit and a Y operand bit. Although the present invention is illustrated with modulus two operands, it should be apparent that other operand moduli values may be used in connection herewith. Each partial product bit of each row which contains one sign bit in the partial product has a negative weight. Partial product bits which have two sign bits or two magnitude bits have a positive weight. The rows of partial product bits are arranged to form rank ordered columns which may be added to form product bits P0 thru P5 wherein bit P5 is a sign bit of an output product and bits P0 thru P5 are magnitude bits. The columns are ranked from least significant to most significant from right to left, respectively. The addition of bits in a column to form an output product bit also forms one or more carry bits which are carried over to the next higher weighted or ranked column. In the illustrated form, the maximum number of logic "one" bits which may be present in any column is six which represents four operands in the fourth column and two carry bits from the previous two columns.

Shown in FIG. 1(B) is a sign extension of the array of FIG. 1(A). The signed partial product bit of each row has been extended to a newly created eighth column for the four bits wide input operand example. Sign extension has the effect of eliminating all negative partial product bits in the first three rows of partial product operands except in the newly created eighth column. However, only the first seven columns need to be added to obtain the correct output product. The last row of partial product bits may be represented by the expression $(YS*X)2^3$ since the first partial product bit of the last row begins in the third or $2^3$ weighted column. When the sign bit of the Y input operand is a logic "zero" value indicating Y is a positive value, the last row becomes a row of zero valued operands. However, when the sign bit of the Y input operand is a logic "one" value indicating Y is a negative value, the last row becomes $(-1*X)2^3$ Therefore, the last row of partial product bits becomes the two's complement of the X input operand multiplied by eight.

Shown in FIG. 1(C) is the array of FIG. 1(B) which has been modified to also obtain the two's complement of input operand X in the last row of the array another way. A known technique of obtaining the two's complement of operand X is to form the one's complement of the X operand and add one. However, an algorithm which would perform this function would be conditioned on the sign of the Y input operand as mentioned above. The array in FIG. 1(C) represents a method to structure the last row of the array without the structure being conditioned on the sign of the Y input operand. In particular, a logic "one" is always added in the column in which the last row of partial product operands has its lowest ranked bit. When the sign of the Y input operand is positive as indicated by a logic "zero" value, the last row is forced to have a value of negative one so that the positive one which is added in is cancelled. The last row is forced to have a value of negative one by complementing each bit in the last row of operands except the left-most bit. By studying the array of FIG. 1(C) it should be apparent that in the last row of operands when the sign of operand Y is positive, the complement forces the row to become negative one. However, when the sign of operand Y is negative, the complement forces the row to become the one's complement of the X operand. By adding a positive one value in the column of the least significant bit of the fourth row, the two's complement of the X operand is obtained as desired. Therefore, an unconditional method has been provided to uniformly form the last row of the array of FIG. 1(B) regardless of the sign of the Y input operand.

Shown in FIG. 1(D) is a further simplification of the array of FIG. 1(C) which allows the entire last row to be complemented. By moving the correction factor of "one" to the right to the lowest ranked column representing "$2^0$", the entire last row may be complemented which allows more uniformity when implementing the array of FIG. 1(D) in hardware. As can be readily seen from FIG. 1(D), the array has a uniform nature and may be simply implemented. The array simplification technique of FIGS. 1(A)–1(D) is discussed by C. R. Baugh and B. A. Wooley in "A Two's Complement Parallel Array Multiplication Algorithm" in the IEEE *Transactions on Computers*, Vol. C-22, No. 12, December 1973, pages 1045–1047.

Shown in FIG. 2 is a multiplier 10 which expands the theoretical techniques of FIGS. 1(A) thru 1(D) to provide a high speed serial multiplier for signed operands. A data input operand labeled "X" is serially coupled to an input labeled "X Input" of a shift register 12 and clocked into shift register 12. Shift register 12 may be reset by a reset signal. A data input operand labeled "Y" is substantially simultaneously serially coupled to an input labeled "Y Input" of a stack register 14 and clocked into stack register 14. Stack register 14 may also be reset by a reset signal. A clock signal is coupled to a clock input of both shift register 12 and stack register 14. An output of shift register 12 is connected to a first input of a logic array circuit 16, and an output of stack register 14 is connected to a second input of logic array circuit 16. A first output of logic array 16 is connected to an input of an inverter 18. A second output of logic array 16 is coupled to a first input of a summation circuit 20. An output of inverter 18 is connected to a second input of summation circuit 20. An output of summation circuit 20 provides an output product. Summation circuit 20 has first and second carry outputs labeled "C2" and "C4", respectively. The second carry output of summation circuit 20 is connected to an input of a delay circuit 22, and an output of delay circuit 22 is connected to an input of a delay circuit 24. An output of delay circuit 24 is connected to a third input of summation circuit 20. The first carry output of summation circuit 20 is connected to an input of a delay circuit 26. An output of delay circuit 26 is connected to a fourth input of summation circuit. A reset signal is coupled to delay circuit 26.

In operation, the X data input operand is serially shifted into shift register 12 while the Y data input operand is serially shifted into stack register 14. Shift register 12 functions by being loaded so that data is always loaded into the top location and shifted down. In contrast, data is loaded into stack register 14 by loading bits into the next available location in the stack. In this manner, the partial product bits of each column of the array of FIG. 1(D) from least significant column to most significant column are produced by registers 12 and 14 and by logic array 16 as registers 12 and 14 are clocked with data. In other words, after the first clock cycle, the first column of partial product bits is present at the output of logic array 16.

Shown in FIGS. 3(A) thru 3(G) is an illustration of seven clock cycles during which data is shifted thru registers 12 and 14 and the partial product bits are formed. After the fourth clock cycle, stack register 14 is no longer clocked with data, but shift register 12 continues to be clocked with the sign bit of the X input operand until shift register 12 contains nothing but the sign bit of the X operand during the seventh clock cycle. After the seventh clock cycle, the product has been completely formed and registers 12 and 14 do not change state until a reset occurs and new input operand values are available. Logic array 16 is a logic circuit which performs a logical "ANDing" of predetermined bits of the X operand and the Y operand to generate the partial product bits of the multiplication array. In the illustrated form of FIGS. 3(A) thru 3(G), the top most bit of shift register 12 is logically ANDed with the bottom most bit of stack register 14. The first output of logic array 16 provides an inverted bit which is a bit from the fourth row of partial product bits of the array of FIG. 1(D). The second output of logic array 16 sequentially provides in serial form three bits which are the remaining three bits of each column of partial product bits shown in FIG. 1(D), from left to right. The inversion provided by inverter 18 and the coupling of a logic "one" value carry bit labeled "C2" to summation circuit 20 thru delay circuit 26 of FIG. 2 accomplish the two's complementing of the last row of the array shown in FIG. 1(B) as further explained below.

Figure 4:
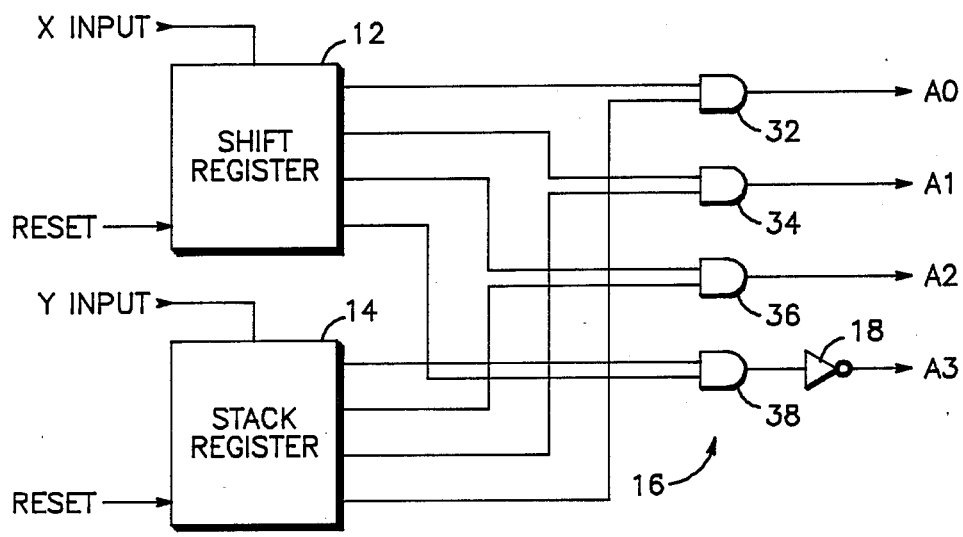
FIG. 4 illustrates in partial schematic diagram form a portion of the multiplier illustrated in FIG. 2.

Shown in FIG. 4 is a more detailed illustration of how logic array 16 may be implemented and connected to shift register 12 and stack register 14. Elements which are commonly illustrated in FIGS. 2 and 3 and in FIG. 4 are commonly numbered. A first output of shift register 12 is connected to a first input of an AND gate 32, and a second output of shift register 12 is connected to a first input of an AND gate 34. A third output of shift register 12 is connected to a first input of an AND gate 36, and a fourth output of shift register 12 is connected to AND gate 38. A first output of stack register 14 is connected to a second input of AND gate 38, and a second output of stack register 14 is connected to a second input of AND gate 36. A third output of stack register 14 is connected to a second input of AND gate 34, and a fourth output of stack register 14 is connected to a second input of AND gate 32. An output of AND gate 32 provides a lowest ranked bit labeled "A0", and an output of AND gate 34 provides a next higher ranked bit labeled "A1". An output of AND gate 36 provides a successively higher ranked bit labeled "A2". An output of AND gate 38 is connected to an input of inverter 18. An output of inverter 18 provides the highest ranked bit labeled "A3". For purposes of correlation between FIGS. 3(A)–(G) and FIG. 4, the three bits outputted from the second output of logic array 16 of FIGS. 3(A)–3(G) are bits A0, A1 and A2 of FIG. 4, respectively. The bit outputted from the first output of logic array 16 of FIGS. 3(A)–3(G) is bit A3 of FIG. 4.

In operation, logic array 16 functions to effect the multiplication of the bits of the X and Y operands to provide the partial product bits as shown in FIG. 1(D). By logically ANDing a predetermined bit from the X data operand with a predetermined bit from the Y data operand, a partial product operand is formed so that the array of FIG. 1(D) may be readily formed. Bit A3 provided by inverter 18 represents the partial product bit from the fourth row of the array for a predetermined column.

Referring again to FIG. 2, summation circuit 20 sequentially receives the partial product bits in serial form of each column of the multiplication array of FIG. 1(D). In response, summation circuit 20 sequentially adds the bits of each column of the multiplication array generated by gate array 16. Because the multiplication array generated by registers 12 and 14 and logic array 16 is the array illustrated in FIG. 1(D), the addition of bits in each column is an addition of unsigned bits. The correction factor represented by the logic "one" bit which is added into the least significant column of the array of FIG. 1(D) is provided by delay circuit 26 which initially contains a logic "one" due to being set by the illustrated reset signal. Delay circuit 26 contributes a logic "one" bit during the addition of the first column and may contribute a carry bit for additional columns should carry bits be generated. Since the sign of the bits does not have to be accounted for, a simple addition provides the output product bits. Therefore, summation circuit 20 sequentially provides product output bits P0 thru P5 and product sign bit PS. Carry terms which result from the addition of the bits in the array columns are delayed a predetermined number of cycles according to the weight of the carry bit before being used in the summation of an appropriate column.

The four bit X and Y input operands are serially shifted into registers 12 and 14 while product output bits are serially shifted out of summation circuit 20. As a result, there is no pipelining and no clock delay between the clocking of input registers 12 and 14 and the availability of output product bits.

Figure 5:
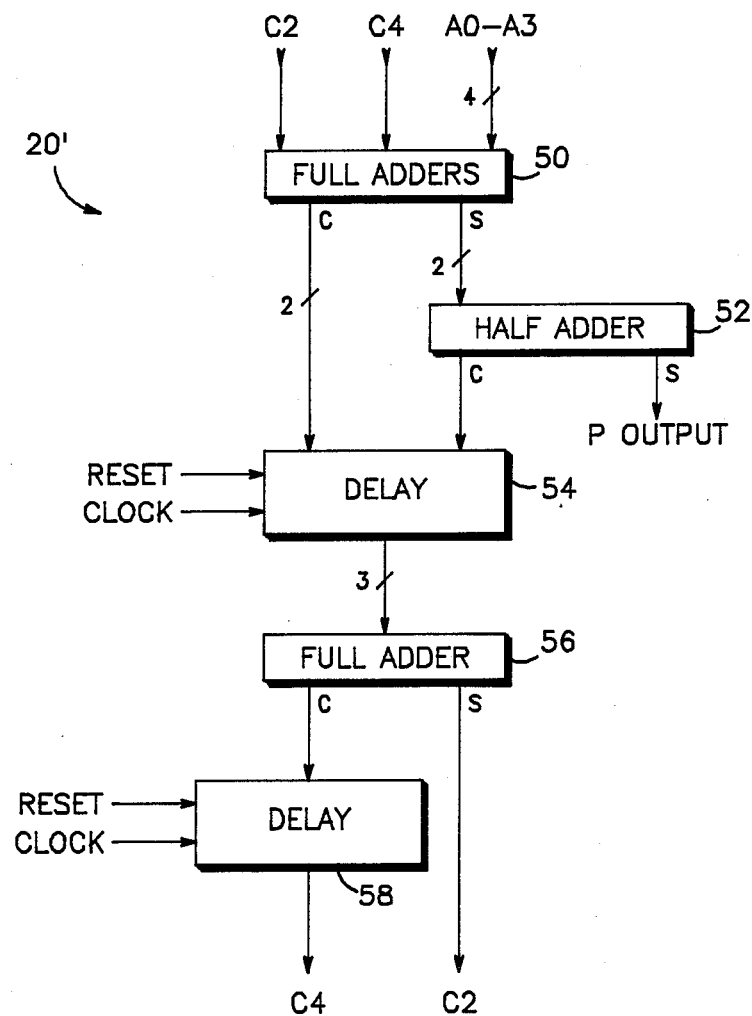
FIG. 5 illustrates in block diagram form a modified portion of the multiplier illustrated in FIG. 2.

Shown in FIG. 5 is an illustration of a modification of summation circuit 20 and delay circuits 22 and 24 which is labeled summation circuit 20'. A plurality of full adder circuits 50 which operate simultaneously in parallel receives the input partial product bits A0–A3 generated by logic array 16. In addition, two carry bits C2 and C4 which are generated by summation circuit 10 as explained below are coupled back as inputs to the plurality of full adder circuits 50. In the context of a four bit wide example, the number of full adder circuits 50 required is two. Each of the two full adder circuits of full adder circuits 50 receives three of the six input data bits shown in FIG. 5. One full adder circuit receives two of the A0–A3 bits and a carry bit while the other full adder circuit receives the other two of the A0–A3 bits and the other carry bit. The order of the bits which the full adder circuits receive is not important because all the bits which the full adder circuits receive at any particular time are from the same ranked partial product column. In order to produce the output product bits, the total number of bits having a logic "one" value in the six input data bits are counted to determine if an even or an odd number of logic "one" values exist. Each full adder of the plurality of adder circuits 50 provides a sum output and a carry output. Therefore, in the illustrated example of FIG. 5, two sum output bits are connected to first and second sum inputs of a half adder 52, respectively. Two output carry bits, one from each of the two full adders of the plurality of circuits 50, are connected to first and second inputs of a delay circuit 54, respectively. The sum output of the plurality of full adder circuits 50 represents the number of odd or unpaired logic "one" bits which are coupled to the carry and sum inputs of the circuits 50. The carry output of the plurality of full adder circuits 50 represents the number of even or paired logic "one" bits which are coupled to the carry and sum inputs of the full adder circuits 50. The sum outputs from the two full adders of the full adder circuits 50 are added by half adder 52 to provide an output product bit. The sum output of half adder 52 indicates whether the original six inputs of circuits 50 contained an even or an odd number of logic "one" values. A carry output of half adder 52 is connected to a third input of delay circuit 54. The carry output of half adder 52 indicates the number of pairs of logic "one" bits present in the two sum outputs of full adder circuits 50. Delay circuit 54 functions to delay the carry outputs from the plurality of full adder circuits 50 and from half adder 52 before the carry outputs are coupled to a full adder 56. The output of delay circuit 54 indicates the number of pairs of logic "one" bits in the six original inputs which are coupled to full adder circuits 50 in the previous clock cycle. Full adder 56 adds the carry outputs from full adder circuits 50 and half adder 52 to form the first output product carry bit C2. A carry output of full adder 56 is connected to an input of a delay circuit 58. Delay circuit 58 functions to output the carry output bit of full adder 56 after another amount of delay which is sufficient to weight the output product carry C4 one higher ranked column weight. It should be apparent that delay circuits 54 and 58 of FIG. 5 function to implement the delay function illustrated by delay circuits 22, 24 and 26 of FIG. 2. Delay circuits 54 and 58 are reset before the first cycle of a new multiply operation. Delay circuit 54 is reset to a magnitude of one, and delay circuit 58 is reset to a logic "zero" value. Any of a variety of circuits may be used to implement the delay circuits shown herein.

It should be readily apparent that the present invention may be expanded to accomodate larger bit size operands. When a larger multiplication array is utilized, the number of carry outputs provided by summation circuit 20 increases and is equal to the LOG base 2 of the number of bits in the Y input operand rounded up to the closest integer.

By now it should be apparent that a multiplier structure which is very useful for high speed repetitive multiply operations of signed operations has been provided. By using a pipelined structure in the summation circuit 20' which takes advantage of parallel operation of adders, propagation delays in the multiplier are minimized. By having the delay function used in coupling carry bits from the output of summation circuit 20 to the input of summation circuit 20 internalized into summation circuit 20', further delay is reduced between the time the carry bits are generated and the time the carry bits are actually used.

While an embodiment has been disclosed using certain assumed parameters, it should be understood that certain obvious modifications to the circuit or the given parameters will become apparent to those skilled in the art, and the scope of the invention should be limited only by the scope of the claims appended hereto.

I claim:

1. A high speed serial data multiplier, comprising:
   first clocked data storage means for receiving a first signed input operand and serially storing a sign bit and magnitude bits of the first input operand in a predetermined order in response to a clock signal;
   second clocked data storage means having predtermined register locations for receiving a second signed input operand having a sign bit and magnitude bits and serially clocking the magnitude bits and sign bit in response to the clock signal thru the second clocked data storage means until the second clocked data storage means contains the sign bit of the second operand in all the predetermined register locations;
   logic means coupled to the first and second clocked data storage means, for successively forming groups of predetermined partial product bits of positive value in response to receiving clocked bits from the first and second clocked data storage means; and
   sum means coupled to the logic means for successively receiving groups of predetermined partial product bits serially from the logic means and adding the partial product bits with one or more input carry bits to provide an output product bit and one or more output carry bits for each receipt of partial product bits, said sum means having a delay portion for delaying outputting of said output carry bit or bits generated from the addition of partial product bits before coupling said output carry bit or bits to an input of the sum means as an input carry bit for a successive output product bit generation, said delay portion further providing a correction input bit for use during an initial addition of partial product bits.

2. The high speed serial data multiplier of claim 1 wherein the sum means further comprise:
   first adder means for receiving the partial product bits and input carry bit or bits and simultaneously adding the partial product bits and input carry bit or bits to provide first intermediate carry bits and sum bits;
   second adder means coupled to the first adder means for receiving the sum bits and adding the sum bits to provide the output product bits and a second intermediate carry bit; and
   third adder means coupled to the first and second adder means for receiving and adding the first and second intermediate carry bits to provide said output carry bit or bits.

3. The high speed serial data multiplier of claim 1 wherein the first clocked data storage means is a stack register and the second clocked data storage means is a shift register.

4. The high speed serial data multiplier of claim 1 wherein the first and second clocked data storage means have substantially the same number of register storage locations.

5. A method of serially multiplying a first and a second input operand, comprising the steps of:
   receiving the first signed input operand and serially storing a sign bit and magnitude bits of the first input operand in a first storage device in a predetermined order in response to a clock signal;
   receiving the second signed input operand and serially clocking magnitude bits and a sign bit of the second input operand thru a predetermined portion of a second storage device until the second storage device contains the sign bit of the second operand in all storage locations of the predetermined portion of the second storage device;
   successively forming groups of predetermined partial product bits of positive value during, and in response to, receipt of bits by the first and second storage devices;
   successively adding the groups of predetermined partial product bits with one or more input carry bits to provide output product bits and output carry bits; and
   selectively delaying outputting the carry bits generated from the addition of partial product bits before utilizing the carry bits as input carry bits for a successive output product bit generation.

6. The method of claim 5 further comprising the step of:
   providing a correction input bit of predetermined value to the adding means for use during an initial addition of partial product bits.

7. A high serial data multiplier, comprising:
   a shift register for receiving a first signed input operand and serially storing a sign bit and magnitude bits of the first input operand in a predetermined order in response to a clock signal;
   a stack register for receiving a second signed input operand having a sign bit and magnitude bits and serially clocking the magnitude bits and sign bit thru the stack register in response to the clock signal until the stack register contains the sign bit of the second operand in all storage locations of the stack register;
   a plurality of logic gates coupled to the shift register and the stack register, for successively forming groups of predetermined partial product bits of positive value in response to receiving bits from the shift register and stack register in a predetermined order; and means coupled to the plurality of logic gates for adding the groups of predetermined partial product bits with one or more carry input bits to provide an output product bit and one or more output carry bits for each receipt of partial product bits, said means selectively coupling the one or more output carry bits to an input of the means for use as a carry input bit or bits in a successive output product bit generation.

8. The high speed serial data multiplier of claim 7 wherein the means further comprise a delay portion for delaying outputting said output carry bit or bits generated from the addition of partial product bits before coupling the output carry bit or bits to the input of the means, said delay portion further providing a correction input bit for use during an initial addition of partial product bits.

* * * * *